: 2,763,649

MELAMINE HARDENABLE TERNARY CONDENSATION PRODUCTS

Otto Albrecht, Neuewelt, near Basel, and Armin Hiestand, Binningen, Switzerland, assignors to Ciba Limited, Basel, Switzerland, a Swiss firm No Drawing. Application December 18, 1953, Serial No. 399,166

Claims priority, application Switzerland December 24, 1952

6 Claims. (Cl. 260—249.6)

This invention is based on the observation that new hardenable ternary condensation products containing carboxyl or sulfonic acid groups can be made by reacting (a) a formaldehyde condensation product of a compound of the aminotriazine or urea group or an ether thereof with an alcohol of low molecular weight in any order of succession with (b) an aliphatic compound which contains a carbon chain of at least 7 carbon atoms and a reactive hydrogen atom bound to a hetero atom and (c) a hydroxy- or mercapto-carboxylic acid or a hydroxy- or mercapto-sulfonic acid.

The process can be carried out by first condensing a compound specified under (a) with a compound specified under (b), and then reacting the condensation product so obtained with a compound specified under (c), or by first combining together compounds specified under (a) and (c) and then reacting the product so obtained with a compound specified under (b). Alternatively, all three of the compounds may be reacted together simultaneously.

As formaldehyde-condensation products of compounds of the aminotriazine group, which are specified under (a) above as reaction components, there come into consideration above all reaction products of formaldehyde with 2:4:6-triamino-1:3:5-triazine, which is commonly known as melamine. Such condensation products may contain from 1–6 methylol groups, and they are usually mixtures of different compounds. There also come into consideration methylol compounds of derivatives of melamine which contain at least one amino group, for example, methylol compounds of melam, melem, ammeline, ammelide or halogen-substituted aminotriazines, such as 2-chloro-4:6-diamino-1:3:5 triazine; and also methylol compounds of guanamines such, for example, as benzoguanamine, acetoguanamine or formoguanamine. The ethers of methylolaminotriazines with alcohols of low molecular weight may be derived, on the one hand, from the compounds mentioned above and, on the other, from aliphatic alcohols such as methyl alcohol or butyl alcohol. There may be mentioned, for example, the methyl ethers of methylolmelamines containing 4–6 methylol groups in which 2–6 of the methylol groups are etherified. Such ethers can be obtained, for example, by heating the methylol-melamine with the alcohol in the presence of a small amount of a mineral acid in known manner.

As formaldehyde derivatives of the urea group, which may be used as reaction components under (a) above, there may be mentioned, for example, urea, thiourea and compounds containing the atomic grouping

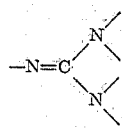

such as dicyandiamide, dicyandiamidine, guanidine, acetoguanamine or biguanide. A suitable starting material is, for example, dimethylol-urea or dimethylol-urea dimethyl ether.

Among the aliphatic compounds which contain a carbon chain of at least 7 carbon atoms, and which are used as reaction components under (b) above, there come mainly into consideration those in which the reactive hydrogen atom is bound to an oxygen, sulfur or non-basic nitrogen atom. The compounds containing non-basic nitrogen atoms are amide-like or urethane-like bodies. There may be mentioned, for example, amides of ammonia or a primary amine, such as methylamine, ethylamine, dodecylamine, octadecylamine or cyclohexylamine, on the one hand, with a carboxylic acid, such as acetic acid, chloracetic acid, butyric acid, capric acid, lauric acid, stearic acid, behenic acid, or oleic acid on the other; furthermore substituted ureas, such as monododecylurea; urethanes such, for example, as those obtainable by reacting chloroformic acid esters of alcohols of high molecular weight with ammonia or primary amines, such as octadecyl-urethane; and also secondary amides such as dilauric acid amide or N:N'-diacylated alkylene or arylene diamines, for example, methylene-distearic acid amide.

As compounds which contain a reactive hydrogen atom bound to a sulfur atom there may be mentioned mercaptans, such as dodecylmercaptan or octadecyl mercaptan, and also esters of alcohols of high molecular weight with mercapto-carboxylic acids, such as esters of thioglycollic acid.

As compounds which contain a reactive hydrogen atom bound to an oxygen atom, there come into consideration carboxylic acids, alcohols and N-methylol-compounds. Among the carboxylic acids which contain a carbon chain of at least 7 carbon atoms, there may be mentioned capric acid, lauric acid, stearic acid, behenic acid, oleic acid, ricinoleic acid or montanic acid. As alcohols there may be used primary, secondary or tertiary alcohols, which may contain a straight or branched chain, such, for example, as dodecyl alcohol, cetyl alcohol, octadecyl alcohol and 2-butyloctanol.

Furthermore, there may be used partial esters of polyhydric aliphatic alcohols with non-aromatic carboxylic acids containing at least 7 carbon atoms or partial ethers of polyhydric aliphatic alcohols with monohydric aliphatic alcohols containing at least 7 carbon atoms. Compounds of this kind are known or can easily be made by methods in themselves known.

The partial esters or partial ethers are, on the one hand, derivatives of glycols, polyglycols, glycerine or glycerine-like compounds and, on the other, of non-aromatic carboxylic acids containing at least 7 and advantageously at least 12, carbon atoms, or of monohydric aliphatic alcohols. Among the polyhydric alcohols suitable for making such compounds there may be mentioned, for example, ethylene glycol, 1:3-propylene glycol, 1:3- or 1:4-butylene glycol or higher glycols, and also polyglycols such as diethylene glycol, triethylene glycol, or higher polyglycols which are obtainable by the condensation of ethylene oxide, and also compounds which contain more than two hydroxyl groups, such as glycerine, erythritol, pentitol and hexitol. Finally there may be used derivatives of polyhydric alcohols which are capable of forming a partial ester or partial ether of polyhydric alcohol in the reaction with a carboxylic acid or a derivative thereof or with an aliphatic monohydric alcohol containing at least 7 carbon atoms. As such compounds there may be mentioned, for example, glycide, but especially halogen hydrins, such as ethylene chlorhydrin, ethylene bromhydrin, glycerine chlorhydrins or epichlorhydrins. Such halogenated compounds can be reacted to form partial esters or partial ethers suitable in the process of the invention, for example, by reacting the halogenated compound with an alkali salt of a carboxylic acid or an alkali alcoholate of a monohydric aliphatic alcohol containing at least 7 carbon atoms.

As carboxylic acids which can be used themselves or in the form of reactive derivatives for making the partial esters (reaction components b), there come into consideration those mentioned above in connection with the acids and amides. Among the monohydric aliphatic alcohols from which the partial ethers used in the process of this invention (also reaction components b) are derived, there may be mentioned, for example myricyl, ceryl, octadecyl, cetyl, dodecyl, oleyl, linoleyl and linolenyl alcohol. Very suitable also are alcohols or mixtures thereof which are obtainable by the reduction of fatty acids which have themselves been obtained by the oxidation of paraffin wax, and also the higher alcohols or mixtures thereof obtainable by total synthesis from carbon monoxide and hydrogen. There are also suitable mixtures of saturated alcohols, such, for example, as are obtainable from drying, semi-drying or non-drying oils by reduction with sodium and alcohol or by other methods, and subsequently hydrogenating the multiple bonds. As examples there may be mentioned the alcohols obtainable in this manner from linseed oil, soya bean oil, hemp oil, poppy-seed oil, wood oil, dehydrated castor oil, cotton seed oil, coconut oil, cod liver oil, whale oil, menhaden oil, sperm oil and the like. There are also suitable alcohols obtainable from tall oil.

Instead of using the free alcohols for preparing the partial ethers, it is of advantage to use their alkali alcoholates or the halogen compounds corresponding to the alcohols, that is to say, alkyl halides.

When the partial esters or ethers are derived from polyhydric alcohols which contain more than two hydroxyl groups in the molecule, one or more of the hydroxyl groups may be esterified or etherified. However, it is necessary that at least one hydroxyl group should remain free. Especially suitable compounds which may be used as reaction components b, are the partial ester from 2 molecular proportions of stearic acid and 1 molecular proportion of glycerine and the partial ether from 2 molecular proportions of octadecyl alcohol and 1 molecular proportion of glycerine.

The N-methylol compounds which can also be used as reaction components b in the present process are advantageously N-methylol compounds of amides or amide-like compounds of the kind mentioned above.

Among the aforesaid compounds which may be used as reaction components b, are advantageously those which contain at least one carbon chain of 16–18 carbon atoms, especially derivatives of stearic acid, of octadecyl alcohol or of octadecylamine.

Very effective final products are obtained by starting from urethanes or methylol-compounds thereof, for example, N-methylol-octadecyl-urethane.

The hydroxy- or mercapto-carboxylic acids or hydroxy- or mercapto-sulfonic acids which may be used as reaction components c, may belong to the aliphatic, cycloaliphatic or aromatic series. There may be mentioned, for example, glycollic acid, glyceric acid, carboxylic acids obtained by the oxidation of sugars, and also dicarboxylic acids, such as tartaric acid; para-hydroxy-benzoic acid, hydroxyethane sulfonic acid, thioglycollic acid, thiophenol sulfonic acid. An especially valuable starting material is thioglycollic acid.

Instead of using only single compounds selected from the reaction components mentioned under (a), (b) and (c), it will be understood that mixtures of 2 or more such compounds may be used.

The manufacture of the new ternary condensation products may be carried out in part by the use of known methods, that is to say, for the synthesis of the binary intermediate products. The manufacture of the condensation products from components a and b is described below with reference to the reaction of methylol-aminotriazines or ethers thereof with alcohols of low molecular weight with N-methylol-amides of carboxylic acids. Thus, for example, the starting materials may be heated at 50–100° C. in the presence of a condensing agent, such as boric acid, and advantageously the volatile hydroxy-compound resulting from the reaction (water or an alcohol of low molecular weight) is removed from the reaction mixture by the use of reduced pressure. When there are used as starting materials in the reaction aminotriazine derivatives containing free methylol groups it is even more advantageous to use an auxiliary solvent, such as benzene or toluene, which enables the water formed in the reaction to be continuously removed from the reaction mixture in the form of an azeotropic mixture. For example, the reaction may be carried out at the boiling point of the auxiliary solvent and the distillate condensed in the reflux condenser passed before being returned to the reaction vessel through a water separator which holds back the water which has been split off. Instead of N-methylolamides, carboxylic acids, carboxylic acid amides and alcohols, which come into consideration as reaction components b can be reacted in a similar manner.

The reaction of the intermediate products obtained as described above with reaction components c, that is to say, with hydroxy- or mercapto-acids, is also advantageously conducted at a raised temperature, advantageously at a temperature of about 100° C. The reaction components may be melted together in a simple manner, or they may be reacted in the presence of an inert organic solvent. It may be of advantage to conduct the reaction under reduced pressure, while removing from the reaction mixture the volatile products formed such as water or alcohol of low molecular weight. In the case of mercapto-acids it is of advantage to work with the exclusion of oxygen, for example, in a current of nitrogen.

The procedure is similar when reaction components a and c are first reacted together and then the intermediate product is condensed with the component b, or when all three components are reacted together simultaneously.

The relative molecular proportions of the components used depends mainly on the number of methylol or methylol-ether groups present in component a. Advantageously one molecular proportion of a compound a, 1–2 molecular proportions of a compound under b and one molecular proportion of a compound under c are reacted together.

In selecting the method of synthesis care must be taken that the final product contains a free carboxylic acid or sulfonic acid group. For example, when a reaction component b is used which easily forms an ester with an acid used as reaction component c it is of advantage, in order to avoid such ester formation, first to react together the components a and b and then to react the resulting condensation product with component c.

In carrying out the condensation of reaction components a and b it may be of advantage to use a catalyst of acid character. As such catalysts there may be used inorganic or organic acids, or substances which yield acids during the reaction or which act in an analgous manner to acids, for example, acid anhydrides or Friedel-Crafts catalysts. Their choice is advantageously made depending on practical considerations, such as the ease with which they can be removed, cost, and influence on the final product. In order that the reaction may be carried out under practically anhydrous conditions, it has been found advantageous to use catalysts which are as far as possible free from water. Advantageous catalysts are for example, concentrated hydrochloric acid, sulfuric acid, phosphoric acid, hypophosphorous acid, phthalic acid, or phthalic anhydride, maleic anhydride, acetic acid, chloracetic acid, formic acid or the like. The catalysts are usually hardening agents for the formaldehyde condensation products used as reaction components. It is therefore advantageous not to use these catalysts in too large quantities. Generally it suffices to use a few parts per mil or per cent, calculated on the total reaction mixture. In order to obtain stable intermediate or final products, it is of advantage to use catalysts which can be removed from the reaction mixture after the reaction, that is to say, before further working up of the reaction mixture, by simple means such as distillation, neutralization and, if desired, subsequent filtration to remove precipitated salts or washing with water or solvents. This applies more especially to the use as catalysts of strong acids, which must be neutralized with special caution. The method used for removing the catalyst should have no disadvantageous influence on the final product.

The new products obtainable by the sequence of reactions described above are in general wax-like substances, which are insoluble in water, but are soluble or easily dispersible in water in the form of their salts. As salts there come into consideration, more especially, the alkali salts or ammonium salts. However, salts may also be prepared from simple amines.

The water-soluble salts obtainable by the present process can be used, provided that they have been prepared from suitable starting materials, inter alia as auxiliary substances, for example, in the textile, leather or paper industries. They can be used as agents for imparting water-repellent properties, and also as agents that reduce creasing or diminish shrinking during washing, and especially as softening agents. Interesting dressing effects can be obtained on wool with suitable products made in accordance with the present process, and especially a greatly enhanced resistance to shrinkage, coupled with an agreeable soft feel.

The products of the present process may be applied by treating the material to be improved, advantageously a textile, with a solution, advantageously an aqueous solution, of a salt of the ternary condensation product, and if desired heating the material at a raised temperature.

For the purpose of dressing wool the material may be treated for example, with an aqueous solution of 5–10 per cent strength of a salt of a product of the process, drying the material at a low temperature, and then heating it for a short time, for example, for 2 hours, at 80–90° C. In this manner especially valuable dressings are obtained with products which contain an aliphatic radical containing about 16–18 carbon atoms.

For the purpose of dressing cellulose materials, such as cotton or artificial silk of regenerated cellulose, the material impregnated with an aqueous solution of a salt of a suitable product, advantageously in the presence of an excess of acid, such as formic acid, may, after being pressed or squeezed without intermediate drying be heated at a high temperature, for example, at 100–150° C. Products which contain an aliphatic radical having about 16–18 carbon atoms impart to the material treated in this manner a soft feel, which is highly resistant to washing.

There may be added to a liquor suitable for imparting a water-repellent dressing a water-soluble aluminium salt, for example, aluminium triformate, or a zirconium compound, for example, a zirconium salt, or a brine of hydrated zirconium dioxide, and also dispersions of paraffin wax.

For producing a water-repellent dressing there are generally used 10–80 grams of the condensation product per liter of the foularding bath, whereas for imparting a soft feel smaller quantities suffice, for example, 0.1–0.3 per cent on the weight of the fabric.

The products of the invention may be used alone or as already partially explained above, together with other substances such as salts, especially those of weak acids, for example, sodium acetate, aluminium acetate and also together with hydrocarbons such as paraffin wax, solvents methylolamides, protective colloids, dressing or matting agents, such as methylol-ureas, loading agents, or other softening agents or the like, these additions being so selected that they do not precipitate the products of the invention from solutions of their salts.

As softening agents there are especially suitable salts of compounds which are derived from a methylolmelamine ether, an N-methylol-urethane of an alcohol containing 16–18 carbon atoms and thioglycollic acid. Advantageously, such salts are used together with dispersing agents resistant to lime, such as the sodium salt of 2-heptadecyl-N-benzyl-benzimidazole disulfonic acid.

The following examples illustrate the invention, the parts and percentages being by weight unless otherwise stated and the relationship of parts by weight to parts by volume being the same as that of the kilogram to the liter:

*Example 1*

324 parts of finely pulverized hexamethylol-melamine are introduced, while stirring, at room temperature into 2000 parts by volume of methyl alcohol which contains 100 parts by volume of concentrated hydrochloric acid. After 10 minutes dissolution of the methylol-compound is complete. The solution is immediately stirred with about 160 parts of calcined sodium carbonate until it is neutral to litmus. The precipitated salt is filtered off and the solution is evaporated to a syrup in vacuo. The syrup, after it has been concentrated to about 99 per cent strength is filtered hot in order to remove the residual salt.

68 parts of N-methylol-octadecyl-urethane, obtained from octadecyl-urethane and formaldehyde by a known method, and 39 parts of the methylol-melamine methyl ether described above are heated for 1–2 hours under a pressure of 10–20 mm. of mercury at 115–120° C. There is obtained a hard wax-like mass.

10.3 parts of the condensation product described above are heated in a current of nitrogen with 0.9 part of thioglycollic acid on the boiling water bath for 3 hours, while stirring. The reaction product is mixed with dioxane, heated and, after being cooled, neutralized with sodium hydroxide solution of 30 per cent strength. The volatile constituents are distilled off at about 50–55° C. under reduced pressure, the new sodium salt remaining behind as a colorless solid mass. When the latter is heated with a small amount of isopropanol, whereupon the greater part of the product dissolves, and then the mixture is diluted with hot water, there is obtained a strongly opalescent solution. After boiling for a few minutes insoluble constituents separate from the solution.

The condensation product described above, and especially a mixture of 70 parts of this condensation product and 30 parts of the disodium salt of 2-heptadecyl-N-benzyl-benzimidazole disulfonic acid, can be used as a softening agent for textile fibers, for example, viscose artificial silk. When ammonium chloride is added to the impregnation liquor in impregnating viscose artificial silk, and the material, after being dried, is heated for one hour at 100° C., the resulting soft effect is resistant to washing.

*Example 2*

60 parts of stearic acid N-methylolamide from commercial stearic acid and 39 parts of the methylol-melamine methyl ether described in the first paragraph of Example 1 are heated for 1–2 hours under a pressure of 10–20 mm. at 115–120° C. There is obtained a hard wax-like mass which is clearly soluble in paraffin wax and does not again melt in a boiling water bath.

9.5 parts of the condensation product described above and 1 part of thioglycollic acid are heated in a current of nitrogen for 3 hours in a boiling water bath, while stirring. The product is taken up in dioxane, neutralized with sodium hydroxide solution of 30 per cent strength, and the volatile constituents are distilled under reduced pressure. The residue so obtained is a colorless solid mass, which can be taken up in hot water to yield an opalescent solution.

Example 3

81 parts of commercial stearic acid are heated at 140° C., while stirring, in a closed round flask. A total of 8.11 parts of sodium carbonate (98 per cent strength) is then introduced in small portions while the temperature of the melt is simultaneously raised to 160–170° C. As soon as all the sodium carbonate has been consumed, which can be recognized by the cessation of the evolution of carbon dioxide, the stearic acid-sodium stearate melt is cautiously cooled to about 130° C. There are then slowly introduced dropwise 14 parts of epichlorhydrin, and then the melt is slowly reheated to 150° C. When all the epichlorhydrain has been introduced, the whole is stirred for a further 7 hours at 140°–150° C.

When a test portion is withdrawn from the well stirred melt and, after taking it up in ether, extracting with dilute acid and subsequently washing the product with distilled water, the acid number is determined, the latter value is found to be 1–3. The hydroxyl number is 96.5, instead of 94.5 as calculated for a diglyceride of commercial stearic acid having a molecular weight of 270.

135.2 parts of the ester from highly methylated methylol-melamine and stearic acid described in the first paragraph of Example 4 are introduced into the melt of the above described stearic acid diglyceride cooled to 120° C. Under a good vacuum produced by a water jet pump the vigorously boiling contents of the flask are first heated for 2 hours at 120° C., then heated up to 160° C. in the course of one hour, and heated for 2 hours at 200° C.

After pouring out the reaction mass on to a metal plate, there is obtained a very hard and brittle product which is soluble in paraffin wax.

10 parts of the condensation product so obtained are stirred with 0.7 part of thioglycollic acid for 3 hours in a current of nitrogen in a boiling water bath. The product is dissolved in warm dioxane, cooled and neutralized with caustic soda solution of 30 per cent strength. After evaporating the mixture to dryness at 40–50° C. under reduced pressure, the new sodium salt is a colorless pulverizable mass, which yields a feebly opalescent solution when taken up in hot water.

Example 4

100 parts of the methylol-melamine methyl ether described in the first paragraph of Example 1 are heated with 130 parts of stearic acid under a pressure of 10–20 mm. at 180–200° C. until the acid number of the product has fallen to 5–8.

135 parts of the ether-ester so obtained are stirred with 15 parts of thioglycollic acid in a current of nitrogen for 2½ hours in a boiling water bath. Ethyl alcohol is added, and the mixture is neutralized with sodium hydroxide solution of 30 per cent strength and evaporated to dryness. For the purpose of further purification the residue is triturated with about 400 parts of isopropanol and diluted with 300 parts of water. The whole is heated on the water bath until almost complete dissolution has occurred, a small amount of undissolved matter is filtered off, and the mixture is evaporated to dryness at 40–45° C. under reduced pressure. The sodium salt of the new condensation product so obtained is a solid colorless mass which when taken up in hot water yields a feebly opalescent solution which foams upon agitation. The new sodium salt is more easily soluble in aqueous isopropanol than in water.

Example 5

1 part of the methylol-melamine methyl ether described in the first paragraph of Example 1 is heated with 1.3 parts of stearic acid under a pressure of 10–20 mm. at 180–200° C. until the acid number of the product has fallen to 5–8.

9 parts of the resulting condensation product and 0.8 part of glycollic acid are stirred for 3 hours in a boiling water bath. The mixture is diluted with dioxane, heated, then cooled and neutralized with sodium hydroxide solution of 30 per cent strength. By evaporating the mixture to dryness, the new sodium salt is obtained in the form of a solid mass which yields with hot water a solution which foams upon agitation.

Example 6

81 parts of commercial stearic acid are converted into the diglyceride as described in the first paragraph of Example 3. 147 parts of the condensation product obtained as described below from highly methylated methylol-melamine and N-methylol-octadecyl-urethane are introduced into the melt, cooled to 120° C., of stearic acid diglyceride. Under a good vacuum produced by a water jet pump the contents of the flask are first heated for 2 hours at 120° C., then heated up to 160° C. in the course of one hour, and heated for 2 hours at 200° C.

After pouring the reaction mass on to a metal plate, there is obtained a brittle wax-like mass which is soluble in paraffin wax. The condensation product from methylated methylol-melamine and N-methylol-octadecyl-urethane is prepared by heating a mixture of 68 parts of N-methylol-octadecyl-urethane and 39 parts of the methylol-melamine methyl ether described in the first paragraph of Example 1 at 115–120° C. for 1–2 hours under a pressure of 10–20 mm. There is obtained a hard wax-like mass which is soluble in paraffin wax.

10 parts of the condensation product described above and 0.7 part of thioglycollic acid are heated in a current of nitrogen for 3 hours in a boiling water bath. The product is dissolved in dioxane, neutralized with sodium hydroxide solution of 30 per cent strength, and evaporated to dryness under reduced pressure at 40–50° C. The residue is a pale pulverizable mass. When it is stirred in finely pulverized form with isopropanol, then diluted with hot water and boiled, there is obtained a strongly opalescent solution.

Example 7

270 parts of commercial stearin alcohol (containing predominantly octadecyl alcohol and a small amount of cetyl alcohol) are heated with 180 parts of the methylol-melamine methyl ether described in the first paragraph of Example 1 in the course of 3 hours under a pressure of 10–20 mm. of mercury up to 200° C., and then the reaction mixture is maintained at that temperature for a further 2 hours. The reaction product is a soft wax-like mass, which is clearly soluble in paraffin wax.

10 parts of the condensation product so obtained and 1.3 parts of thioglycollic acid are stirred in a current of nitrogen for 3 hours in a boiling water bath. The product is dissolved in dioxane, neutralized with caustic soda solution of 30 per cent strength and evaporated to dryness. The residue so obtained is a colorless pulverizable mass. When the new sodium salt is stirred in a finely pulverized form with isopropyl alcohol at a raised temperature, then diluted with hot water and boiled, there is obtained an opalescent solution.

Example 8

81 parts of commercial stearic acid are converted in the manner described in Example 3 into stearic acid diglyceride. Into the melt of stearic acid diglyceride so obtained cooled to 120° C., are introduced 135.2 parts of the ester from highly methylated methylol-melamine and stearic acid described in the first paragraph of Example 4. Under a good vacuum produced by a water jet pump the vigorously boiling contents of the flask are first heated for 2 hours at 120° C., then in the course of one hour up to 160° C. and for 2 hours at 200° C.

15 parts of the condensation product so obtained and 1.4 parts of thioglycollic acid are heated in a current of nitrogen for 3 hours in a boiling water bath. The product is mixed with dioxane, water is added, and the mixture is neutralized with sodium hydroxide solution of 30 per cent. strength and filtered to remove the undissolved constituents. The latter are boiled with 100 parts of water, and then the undissolved constituents are filtered off and the solution evaporated to dryness. There is obtained the sodium salt of a new condensation product in the form of a practically colorless pulverizable mass which, after being triturated in warm isopropyl alcohol, yields an opalescent solution on the addition of hot water.

Example 9

The procedure is the same as that described in Example 8, except that 2.6 parts of thioglycollic acid are used instead of 1.4 parts. The condensation product obtained by reaction with thioglycollic acid is dissolved in 20 parts of dioxane and neutralized with sodium hydroxide solution of 30 per cent. strength, a small amount of water being added during the neutralization. In this manner there is obtained a turbid solution, which after being dried under reduced pressure at 40–50° C. leaves behind a colorless residue, which when taken up in hot water yields an opalescent solution.

Example 10

10.3 parts of the condensation product described in the second paragraph of Example 1, 1.0 part of a thioglycollic acid and 20 parts of benzene are heated in a current of nitrogen for 4 hours at the boil. The condensate flowing from the condenser is allowed to pass through a water separator in which a small amount of water is separated. The solvent is removed by distillation under reduced pressure, the residue is dissolved in warm dioxane, the solution is filtered to remove undissolved constituents, and the filtrate is neutralized with sodium hydroxide of 30 percent. strength. After drying there is obtained a solid approximately colorless residue, which can be taken up in hot water to yield a feebly opalescent solution.

Example 11

Viscous artificial silk is treated for 30 minutes at 20–30° C. at a liquor ratio of 1:30 in a bath made up with hard water (20° German hardness) which contains 0.1 to 1 per cent. of the salt of the condensation product obtainable as described in Example 1 or 10, 0.04 to 0.4 per cent. of the disodium salt of N-benzyl-2-heptadecyl-benzimidazole disulfonic acid and 1–4 per cent. of ammonium chloride (both calculated on the weight of the yarn), the material is then dried at 70° C. and hardening is brought about at 100° C. There is obtained a viscous artificial silk having a very good soft feel, which is still present after a washing treatment (¼ hour at 90° C. in a bath which contains, per liter, 2 grams of the disodium salt of 2 heptadecyl-N-benzyl-benzimidazole disulfonic acid and 1 gram of ammonia solution of 25 per cent. strength).

Example 12

3.3 parts of sodium hydroxy-ethane sulphonate, containing in addition to the pure substance about 8.4% sodium chloride, are stirred with 50 parts of glacial acetic acid in a boiling water bath, the temperature is allowed to drop to 75° C. and 9 parts of the ether ester described in the first paragraph of Example 4 are introduced in the course of 15 minutes while stirring. The whole is then stirred for 4 hours at 70–75° C. and then for a further hour at 85–90° C. After distilling off the glacial acetic acid at 50–60° C. under reduced pressure there are obtained 14.1 parts of a solid, colorless mass. The new condensation product when taken up in the warm in methanol diluted with water gives an opalescent solution, from which insoluble portions are separated off after boiling for a short time.

What is claimed is:

1. A salt, which in water is at least dispersible, of a hardenable acidic ternary condensation product which has been obtained by condensing (a) at least about one mol of a hexamethylolmelamine methyl ether, at a temperature ranging from about 110° C. to about 200° C. and under reduced pressure, with (b) at least about one mol of at least one aliphatic compound which contains a carbon chain of at least 7 carbon atoms and a reactive hydrogen atom attached to an oxygen atom and is selected from the group consisting of monohydric alcohols, monocarboxylic acid N-methylol amides, N-methylol-urethanes, monocarboxylic acids and diglycerides of said monocarboxylic acids, and then condensing the reaction product thus obtained at a temperature ranging from about 70° C. to about 100° C. with (c) at least about one mol of an aliphatic acid selected from the group consisting of glycollic acid and thioglycollic acid.

2. A salt, which in water is at least dispersible, of a hardenable acidic ternary condensation product which has been obtained by condensing (a) about 1 mol of hexamethylolmelamine hexamethyl ether, at a temperature ranging from 115–120° C. under a pressure of 10–20 mm. Hg, with (b) about 2 mols of N-methylol-octadecylurethane and then condensing the reaction product thus obtained at a temperature of about 100° C. with (c) about 1 mol of thioglycollic acid.

3. A salt, which in water is at least dispersible, of a hardenable acidic ternary condensation product which has been obtained by condensing (a) about 1 mol of hexamethylolmelamine hexamethyl ether, at a temperature ranging from 180–200° C. under a pressure of 10–20 mm. Hg, with (b) about 2 mols of stearic acid, and then condensing the reaction product thus obtained at a temperature of about 100° C. with (c) about 1 mol of glycollic acid.

4. A salt, which in water is at least dispersible, of a hardenable acidic ternary condensation product which has been obtained by condensing (a) about 1 mol of hexamethylolmelamine hexamethyl ether, at a temperature of about 200° C. and under a pressure of 10–20 mm. Hg, with (b) about 2 mols of stearyl alcohol, and then condensing the reaction product thus obtained at a temperature of about 100° C. with (c) thioglycollic acid.

5. A salt, which in water is at least dispersible, of a hardenable acidic ternary condensation product which has been obtained by condensing (a) about 1 mol of hexamethylolmelamine hexamethyl ether, at a temperature ranging from about 180° C. to about 200° C. and under a pressure of 10–20 mm. Hg, with (b) about 2 mols of stearic acid and then with about 1 mol of stearic acid diglyceride, and condensing the reaction product thus obtained at a temperature of about 100° C. with (c) thioglycollic acid.

6. A salt, which in water is at least dispersible, of a hardenable acidic ternary condensation product which has been obtained by condensing (a) about 1 mol of hexamethylolmelamine hexamethyl ether, at a temperature ranging from about 115° C. to about 200° C. and under a pressure of 10–20 mm. Hg, with (b) about 2 mols of N-methylol-octadecyl-urethane and then with about 1 mol of stearic acid diglyceride, and condensing the reaction product thus obtained at a temperature of about 100° C. with (c) thioglycollic acid.

References Cited in the file of this patent

UNITED STATES PATENTS

| | | |
|---|---|---|
| 2,430,708 | D'Alelio | Nov. 11, 1947 |
| 2,448,338 | Widmer | Aug. 31, 1948 |
| 2,524,727 | Dudley | Oct. 3, 1950 |